April 6, 1926.
J. J. ROGACH
1,580,079
SAFETY AUTOMOBILE BRAKE
Original Filed August 21, 1924    2 Sheets-Sheet 1
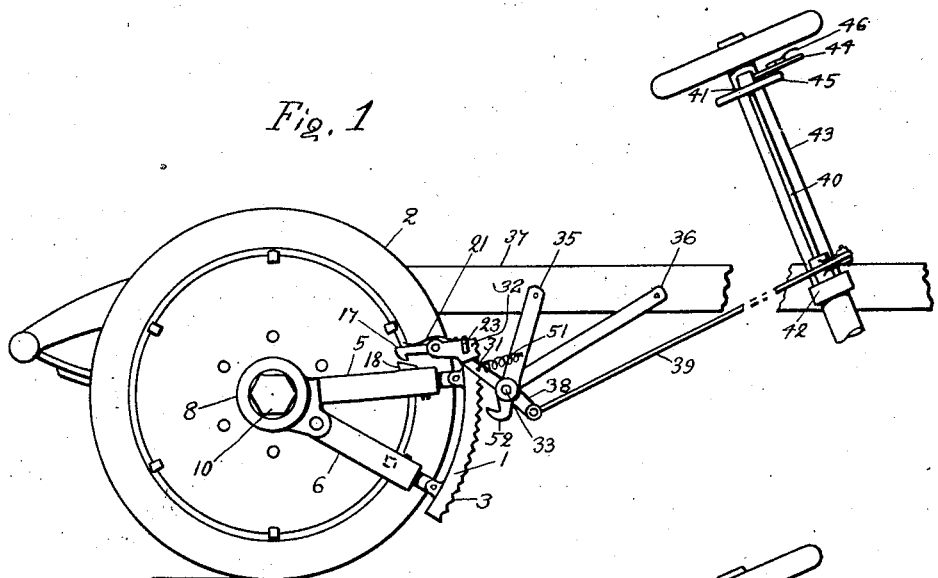
Fig. 1
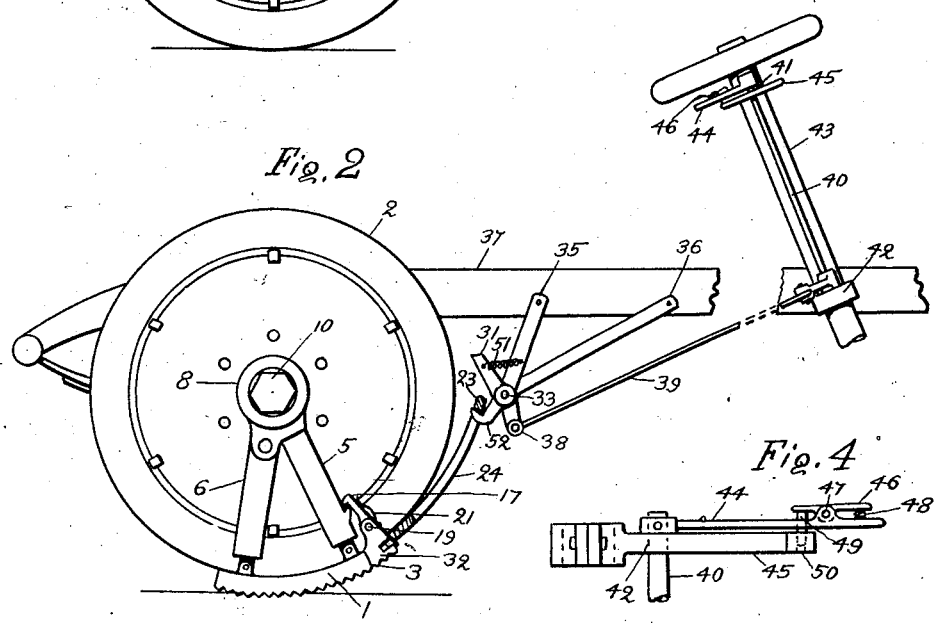
Fig. 2
Fig. 4
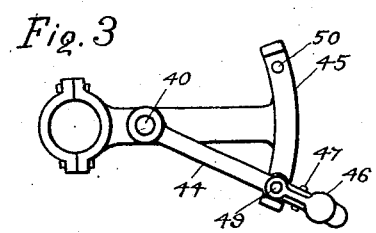
Fig. 3
JOSEPH J. ROGACH
INVENTOR
BY John P. Nikonow
ATTORNEY

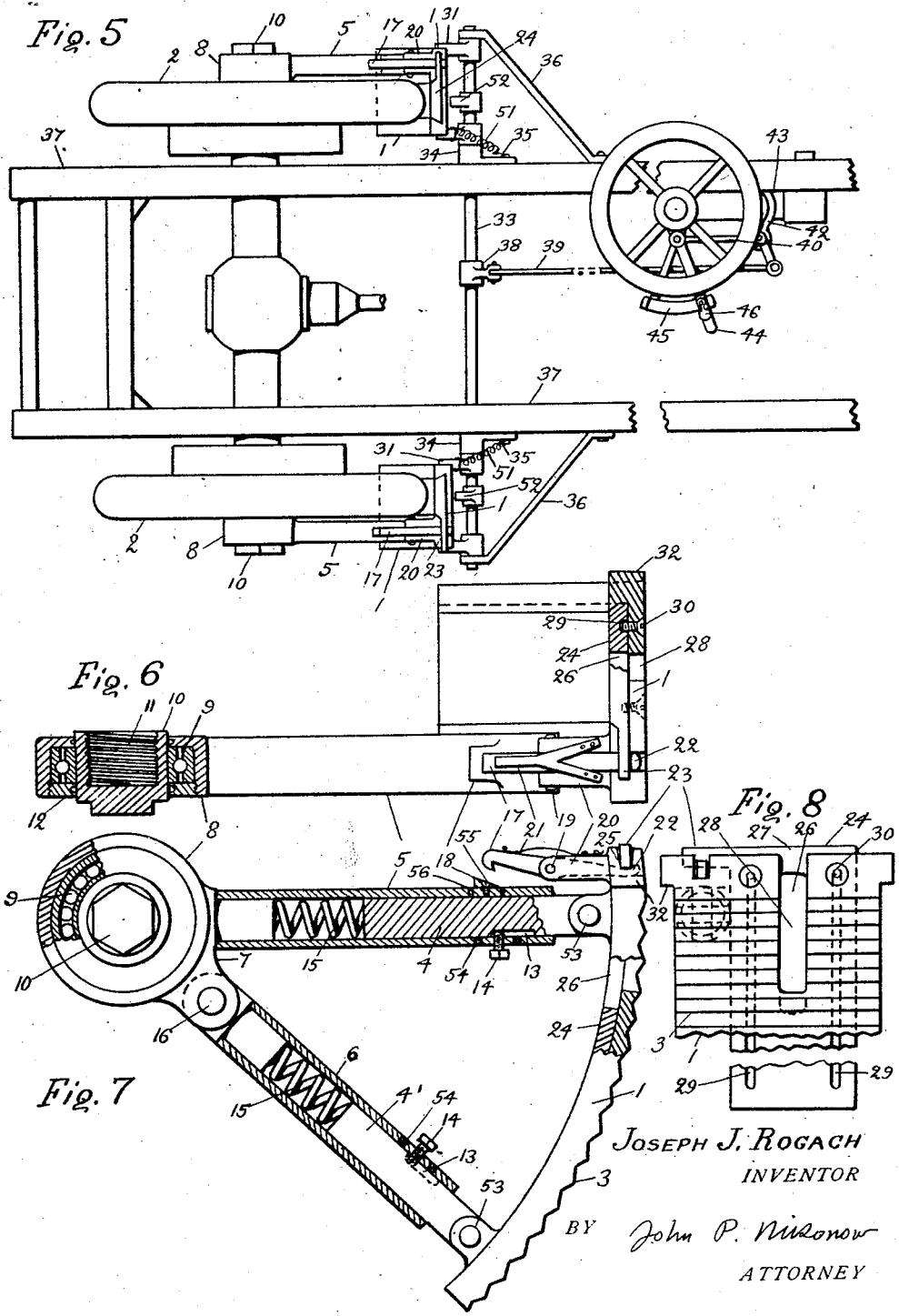

Patented Apr. 6, 1926.

1,580,079

UNITED STATES PATENT OFFICE.

JOSEPH J. ROGACH, OF BROOKLYN, NEW YORK.

SAFETY AUTOMOBILE BRAKE.

Application filed August 21, 1924, Serial No. 733,343. Renewed February 13, 1926.

*To all whom it may concern:*

Be it known that I, JOSEPH J. ROGACH, citizen of Russia, and resident of Brooklyn, in the county of Kings and State of New York, have invented certain new and useful Improvements in Safety Automobile Brakes, of which the following is a specification.

My invention relates to safety or emergency automobile brakes and has a particular reference to braking devices which are introduced between the wheels and the road surface.

The object of my invention is to provide brakes which could be used in an emergency with much greater force and effectiveness than ordinary automobile brakes, so that an automobile or any other similar vehicle might be stopped at a very short distance.

For this purpose I provide braking plates with corrugated or notched surfaces which may be quickly placed between the periphery of the wheels and the road surface, holding them in such position and letting thereby the vehicle drag on these corrugated plates. I further provide a means to remove these plates from under the wheels and to place them in an inoperative position, ready for another emergency service.

My invention is more fully explained in the accompanying specification and drawings in which—

Fig. 1 is a partial elevation of an automobile with my safety brakes, Fig. 2 is a similar view showing my brakes in operation, Fig. 3 a plan view of a hand control attachment, Fig. 4 is a side view of same, Fig. 5 is a plan view of an automobile with my safety brakes, Fig. 6 is a top view of my brake partly in section, Fig. 7 is a side elevation of my brake partly in section, and Fig. 8 is a partial front view of my brake showing the working surface of the brake plate.

My brake consists of a curved brake plate or brake shoe 1 adapted to fit the outer surface of the automobile wheel 2. The operating or outer surface of the shoe 1 is provided with notches or corrugations 3 in order to obtain a greater adhesion or drag on the road surface. The shoe 1 is provided with lugs or extensions 4 slidingly fitted in tubular legs 5 and 6 of a brake bracket 7. This bracket has a hub 8 with a ball bearing 9 fitted over a special hub cap 10 with internal threads 11 adapted to be screwed on the wheel hub in place of an ordinary hub cap. A nut 12 holds the hub on the ball bearing.

The guiding lugs 4 and 4' are provided with slots 13 for screws or pins 14 placed in the tubes 5 and 6 so as to limit the movements of the lugs with the plate 1. Springs 15 tend to push the lugs 4 and 4' out of the tubes 5 and 6 until the ends of screws 14 rest against the edges of the slots 13. As this movement requires a certain change of the angle between the tubes 5 and 6, the tube 6 is mounted pivotally on the bracket 7 with a pin 16.

The slots 13 are made so that with the hub 10 in place on the wheel, the brake shoe 1 stands out from the periphery of the wheel tire at some distance and does not interfere with the rotation of the wheel. The shoe 1 may be pushed against the wheel, however, and locked in this (operative) position by means of a latch 17 engaging a notch 18 on the tube 5. The latch is mounted on a pin 19 passing through sides of a forked lug 20 on the upper corner of the brake shoe 1. A spring 21 tends to press the latch against the notch 18.

The latch 17 has a tail extension 22 which may be acted upon by a lug 23 of a sliding plate 24. A slot 25 is provided in the lug 20 for the releasing lug 23.

The sliding plate 24 has the same curvature as the brake shoe 1 and is dovetailed with its sides in a groove provided on the inner surface of the brake shoe. It has an elongated aperture or a slot 26 in its upper portion with a bridge 27. An open slot 28 is made in the upper portion of the shoe 1, registering with the aperture 26.

Two guiding grooves 29 are formed on the outer surface of the sliding plate 24, terminating at a certain distance from the lower end of the plate. Ends of screws 30 fit in these grooves and prevent the plate 24 from being removed entirely out of engagement with the brake plate 1. My safety brakes are fitted on the hubs of rear wheels (Figs. 1 and 5) and are supported in an inoperative position by means of lugs 31 resting against ears or lugs 32 on the sides of the brake shoes 1. Lugs or brackets 31 are fastened to an operating rod 33 mounted on bearings 34 supported by brackets 35 and 36 fastened to a frame 37 of the automobile. The rod 33 can be turned in its bearings by means of a bracket 38 pivotally connected with a link 39 which in turn is pivoted to a rod 40, rotatively mounted in bearings 41 and 42 mounted on a steering column 43. The rod 40 may be turned by means of a handle 44 sliding along a stationary sector 45. The handle is provided with a catch 46 pivoted on a pin 47. A spring 48 tends to raise the catch, pushing the pin 49 on the other end down. In the extreme forward position of the handle this pin slides into a hole 50 in the sector, thereby locking the handle and the whole system of links and brackets in a position when the lugs 31 support the brake sectors in an inoperative position. Springs 51 tend to turn the operating rod 33 and to release the brakes.

A trigger 52 is mounted on the rod 33 between the lugs 31 and is adapted to enter the slot 26 when the rod 33 is turned and the brakes are released from lugs 31. The hooked end of the trigger 52 is adapted to engage the bridge 27 thereby preventing the sliding plate 24 from moving down with the brake plates 1.

The operation of my device is as follows. Normally the brake sectors are supported in an inoperative position on lugs 31 with the operating handle 44 locked in the forward or inoperative position. The springs 15 keep the brake shoes away from the surface of the wheels. In case of an emergency the catch 46 is pushed down thereby releasing the pin 49 from the engagement with the sector 45, and the rod 33 turns in its bearings under action of the springs 51, moving with it the link 39 and turning the rod 40, bringing the handle 44 in the lower or operating position. The lugs 31 disengage the shoulders 32 of the brake shoes thereby letting the latter drop down on the road. The wheels 2 then ride over the brake shoes, forcing the rods 4 and 4' into their respective tubular sockets 5 and 6 against the spring tension.

The trigger 52, however, enters into the slot 26 and engages the bridge 27, retaining the sliding plate 24 (see Fig. 2). The latter remains then suspended on the trigger, while the brake slides down until the ends of screws 30 come against the ends of grooves 29. In this position the whole system becomes suspended from the trigger hook 52, the wheels dragging over the road on the brake shoes. The resistance to such movement may be made very great by using deep corrugations 3 on the operating surface of the shoe, or spikes for icy pavements. A lining of some soft metal may be also used to advantage under certain conditions, when vehicle speed is slow.

The brake shoe may be hinged to guide lugs 4 and 4' at points near its surface with pins 53 in order to provide sufficient flexibility, when one end of the brake plate enters first between the wheel and the road surface.

The brake sectors may be made adjustable for different wheels by providing additional tapped holes 54 for the screws 14. The notch 18 may be also made adjustable, attached with a screw 55 to one of the holes 56.

With the sliding plate 24 removed, the lugs 23 no longer press on the tails 20 of the latches 17, and the latter become pressed down by the action of springs 21, thereby becoming engaged with notches 18.

When my safety brakes are no longer needed, the handle 44 is pushed forward against the spring 51 until the locking pin 49 engages the hole 50. The lugs 31 turn into an operative position, and the triggers 52 release the sliding plates 24.

With the turning of the wheels 2 the brake plates remain in engagement with the tires, the latches 17 being locked against the notches 18. Consequently the wheel will carry the brake plates around until the shoulders of the brake plates (indicated with numeral 3) are stopped by the lugs 31. Further rotation of the wheel will force the sliding plate in its place inside of the brake shoe until the lug 23 strikes the tail end 20 of the latch 17 thereby releasing the latter from the notch 18 and allowing the brake shoes to move away from the wheel. The whole system then becomes inoperative and suspended on the lugs 31, ready for next service.

The latch 17 must be placed in such relation to the notch 18 that the wheel tire should have but a light friction against the inner brake surface, sufficient to drag the brake around to its inoperative position, but allowing certain slippage when the brake is held by the lugs 31 and until the sliding plate is replaced inside of the brake shoe.

It would be noted that I do not intend to restrict myself to the particular features of the construction described, as the latter may be modified without deviating from the essential points of my invention.

For instance, the brake sectors may be mounted on bearings placed on the axle, on the other side of the wheels. Plain bearings may be used instead of the ball bearings shown; different method of the link connections from the control handle at the steering post; the control handle itself may be placed separately from the steering post, just so that it is within easy reach for the driver. The sliding plate 24 may be provided with lugs or shoulders, and the grooves 29 may be placed on the inner surface of the brake shoes,—to achieve the same purpose of retaining the sliding plate at a certain distance when removed from the brake plate.

Important advantages of my safety brake are that it can stop a moving vehicle in a short distance in emergency without damaging the wheel tires, that it is always ready for service, that its operation is practically instant, but light pressure on the latch 46 being sufficient to bring the system into operation, also that the brake brings itself into an inoperative position, the latter movement being also controlled by the operating handle at the steering post or within driver's reach.

I claim as my invention:

1. In a safety automobile brake, the combination with a brake plate, a bracket supporting said brake plate, yielding connections between said plate and said bracket, means to rotatively support said bracket on the hub of a vehicle wheel, said brake plate being adapted to be wedged between the periphery of the vehicle wheel and the road surface, when said brake is in an operating position, means to hold said brake in this operating position, means to lock said brake plate against the periphery of said wheel, means to release said brake from said operating position, means to hold said brake plate in an inoperative position, means to release said locking means, and means to control changes between said operating and said inoperative positions of said brake, said controlling means being located within reach of the driver of said vehicle.

2. In a safety automobile brake, the combination with a brake plate, adapted to be wedged between periphery of a vehicle wheel and the road surface, when said brake is in an operating position, means to support said brake in this position, a bracket rotatively mounted on said vehicle and coaxially with the axis of said vehicle wheel, yielding connections between said bracket and said brake plate, a shaft rotatively supported on said vehicle, lugs on said shaft adapted to support said brake in an inoperative position, means to turn said shaft thereby releasing said brake from said inoperative position, a sliding extension plate on said brake plate, a trigger on said shaft adapted to hold said sliding extension plate thereby holding said brake plate in an operating position, and means to lock said brake plate against the periphery of said vehicle wheel.

3. In a safety automobile brake, the combination with a brake plate adapted to be wedged between periphery of a vehicle wheel and the road surface when said brake is in an operating position, a sliding extension plate on said brake plate, a shaft rotatably mounted on said vehicle, a trigger on said shaft adapted to hold said extension plate thereby holding said brake plate in said operating position, means to lock said brake plate in a frictional contact with the periphery of said vehicle wheel, a handle on a steering post of said vehicle, operating connections between said handle and said shaft, lugs on said shaft adapted to hold said brake in an inoperative position, and means to release said locking device thereby releasing said brake plate from the contact with said wheel.

4. In a safety automobile brake, the combination with a brake plate adapted to be wedged in an operating position between periphery of a vehicle wheel and the road surface, a bracket rotatively mounted on said vehicle and coaxially with said wheel, yielding connections between said bracket and said brake plate, a sliding extension plate on said brake plate, means to hold said sliding extension plate when said brake is in an operating position, a locking device adapted to lock said brake plate in a frictional contact with the periphery of said wheel, means to release said locking device when said brake is in an inoperative position, means to support said brake plate in said inoperative position, means to push said brake plate away from the wheel in said inoperative position, and means to control changes between said operating and inoperative positions.

5. In a safety automobile brake, the combination with a brake plate, a bracket supporting said plate, a yielding connection between said brake plate and said bracket, means to support said bracket on a vehicle, said brake plate being adapted to be wedged between the periphery of the vehicle wheel and the road surface, when said brake is in its operative position, means to hold said brake plate in said operative position, means to release said brake plate from said operative position, said brake plate being adapted to be brought into inoperative position by the rotation of said vehicle wheel, and means to release said brake plate from its engagement with said vehicle wheel when said brake plate is in its inoperative position.

6. In a safety automobile brake, the combination with a brake plate, a bracket supporting said plate, a yielding connection between said brake plate and said bracket, means to support said bracket on a vehicle, means to support said brake plate in an inoperative position on said bracket, means to release said brake plate from said inoperative position, said brake plate being adapted to fall by gravity into its operative position and to be wedged between the periphery of the vehicle wheel and the road surface, means to hold said brake plate in its operative position, means to release said brake plate from its operative position, means to maintain the engagement of said brake plate with said wheel until said brake plate is brought into its inoperative position, and means to release said brake plate from said wheel, when said brake plate is held in its inoperative position.

Signed at Brooklyn in the county of Kings and State of New York this 15th day of August A. D. 1924.

JOSEPH J. ROGACH.